May 19, 1925.
H. F. SNYDER
TRACTOR
Original Filed March 20, 1916   3 Sheets-Sheet 1
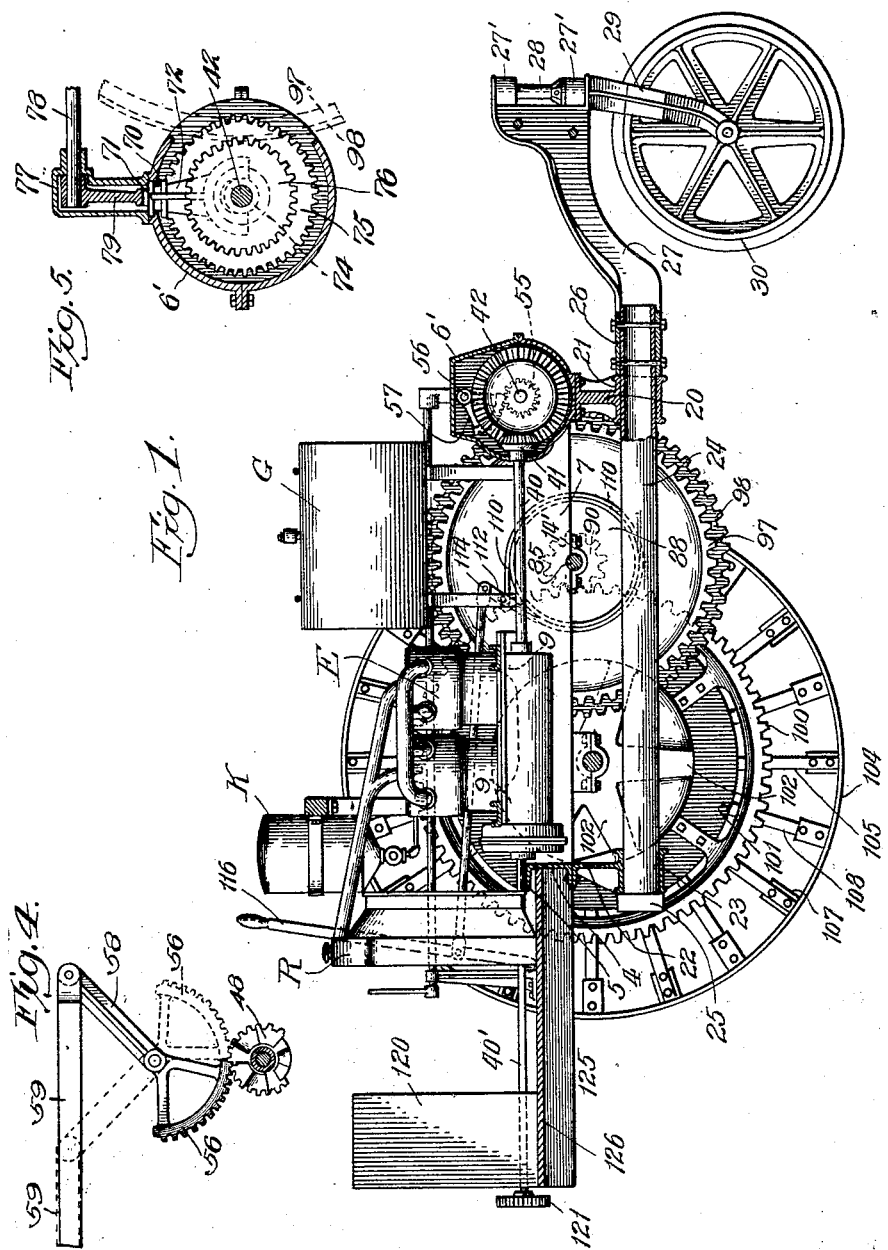

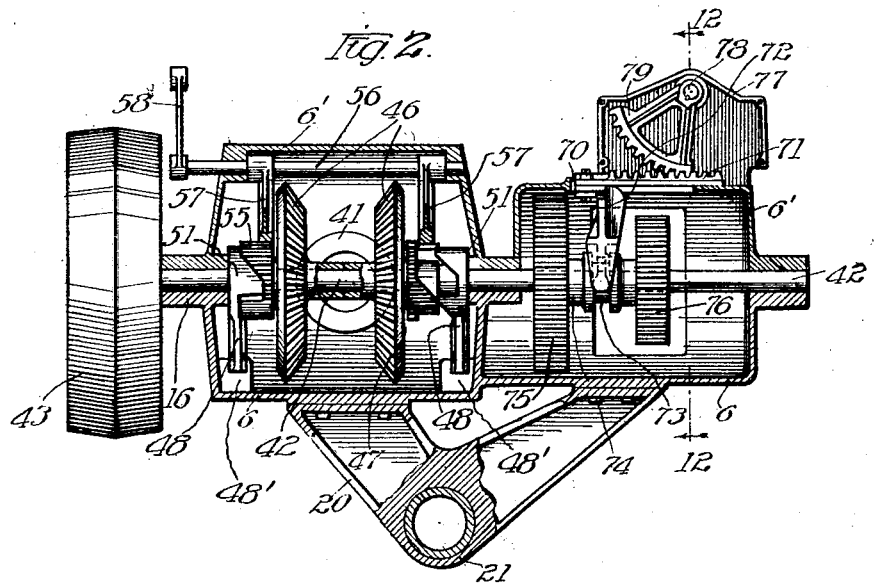
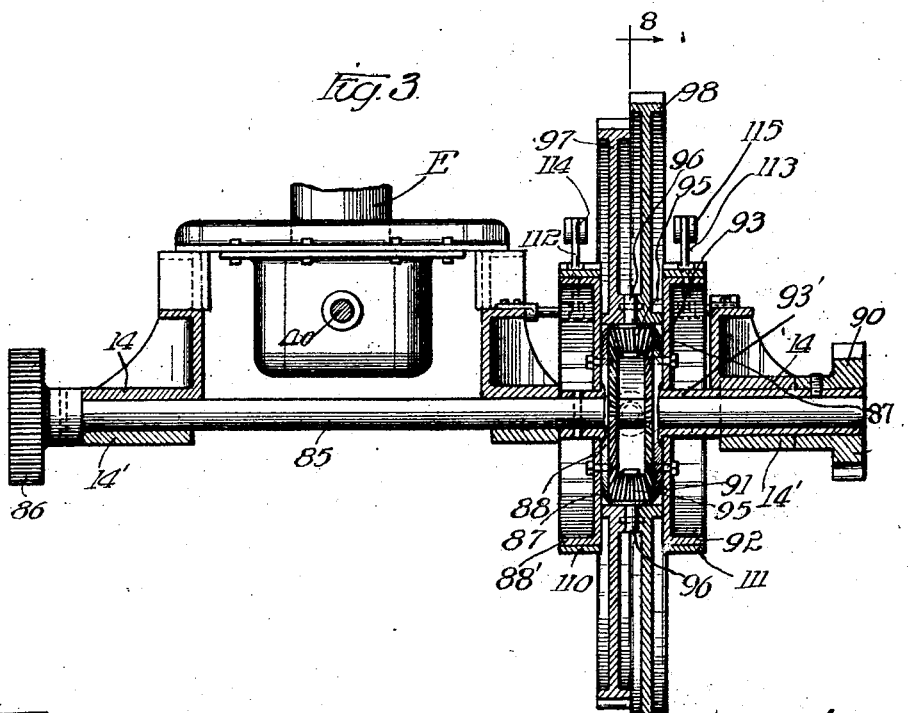

May 19, 1925.
H. F. SNYDER
TRACTOR
Original Filed March 20, 1916     3 Sheets-Sheet 3
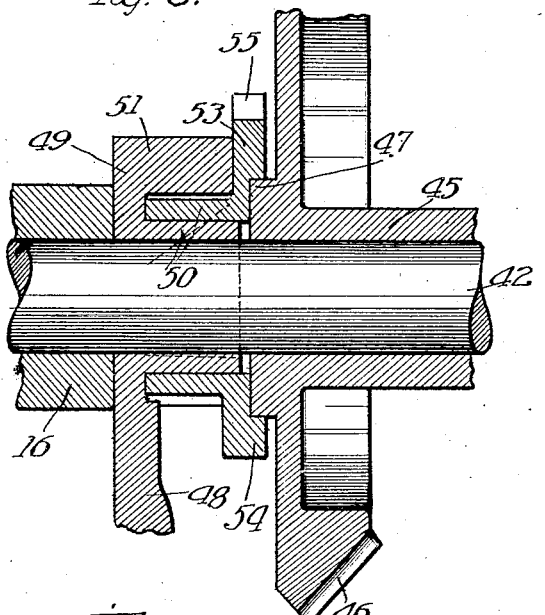
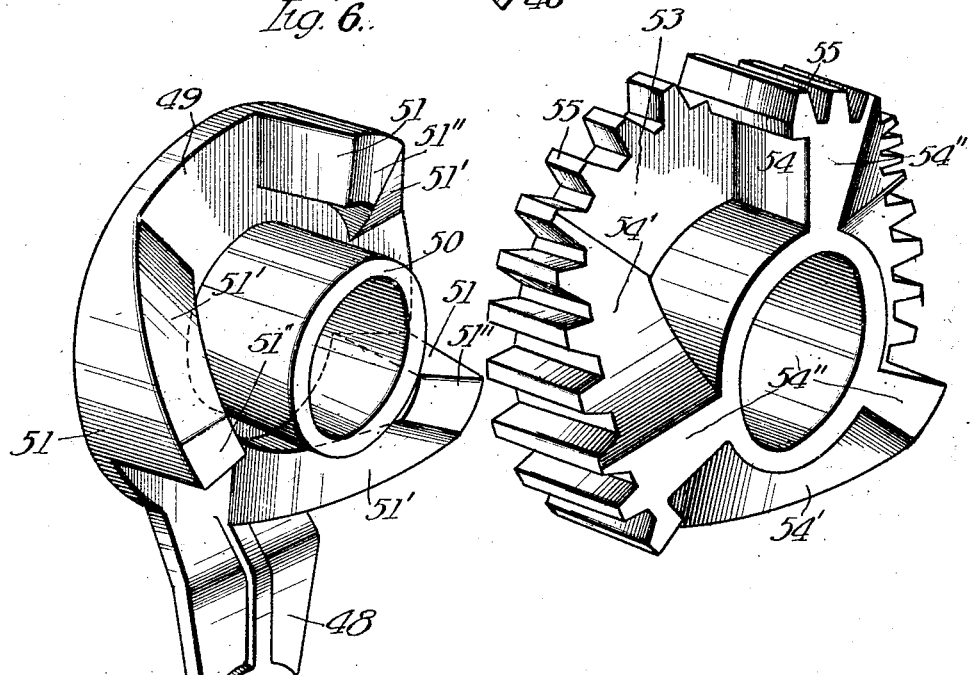

Patented May 19, 1925.

1,537,969

UNITED STATES PATENT OFFICE.

HOWARD F. SNYDER, OF NEWTON, IOWA, ASSIGNOR TO THE MAYTAG COMPANY, OF NEWTON, IOWA, A CORPORATION OF IOWA.

TRACTOR.

Original application filed March 20, 1916, Serial No. 85,516. Divided and this application filed December 9, 1920. Serial No. 429,860.

*To all whom it may concern:*

Be it known that I, HOWARD F. SNYDER, a citizen of the United States, residing at Newton, in the county of Jasper and State of Iowa, have invented certain new and useful Improvements in Tractors, of which the following is the specification.

This invention relates to a self propelled vehicle and particularly to a tractor such as useful for agricultural work, haulage and the like, the present application being a division of my prior application Serial No. 85,516, filed March 20, 1916.

Among the objects of my invention are, to make an economical, simply constructed and efficient tractor which is easy to operate, flexible and easy to control; to provide a rugged simple and efficient reversible driving connection between the source of power and the traction or propelling elements, to provide a novel arrangement of cam mechanism for altering the driving relation between opposed bevel gears and an intermediate bevel gear; to provide a novel construction and arrangement of cams for simultaneously shifting in a selected direction, two opposed bevel gears, into or out of mesh with an intermediate bevel gear; to further provide tractor construction of simple design, having removable parts for assembly and repair and to provide such further objects, advantages and capabilities as will later more fully appear.

My invention further resides in the combination, construction and arrangement of parts illustrated in the accompanying drawings, and while I have shown therein a preferred embodiment, I desire the same to be understood as illustrative only and not as limiting my invention.

In the accompanying drawings Fig. 1 is a sectional side view of a tractor embodying my invention, Fig. 2 is a cross-sectional detailed view of the change speed gearing and associated mechanism, Fig. 3 is a sectional detailed view of the differential mechanism, Fig. 4 is a detailed elevation of a portion of the control for the reversing gearing, Fig. 5 is a detailed cross-sectional elevation of a portion of the shifting control for the change speed gearing, Figs. 6 and 7 are perspective views of the cooperating cam surfaces used in reversing the gearing, and Fig. 8 is a sectional view of the gear shifting mechanism.

In the drawings, the main or supporting frame of the machine is made in a single casting. The frame comprises longitudinal side members and of heavy steel web, braced by top flanges and connected at the rear by an integral web braced by an integral top flange forming a continuation of the top flanges; the side members are spanned at the front by the integral semi-circular half casing 6, adapted to contain machinery hereinafter to be described. The half casing 6, and the rear member are connected by the longitudinal middle span 7. The middle span 7 and side member are provided with alined raised portions 9 having top flanges forming an engine seat. The frame is provided upon its underside with integrally formed half-bearings 14 and 15 to receive the shafts hereinafter to be described and upon its front with the half casing 6 having half bearings 16 for the shafts of the machinery hereinafter to be described.

Bolted to the casing 6 is an angled bracket 20 having therein a bearing 21; bolted to the frame at its rear is an angled bracket 22 having therein a bearing 23. Revolubly mounted in the bearings 21 and 23 is a tubular shaft 24 (see Fig. 1) having at its rear end a cap rigidly mounted thereon and at its front end being sleeved within the tubular shank 26 abutting the bearing 21 so that between the cap and shank 26 the tubular shaft 24 is prevented from longitudinal movement. The forks 27 each have considerable rise as is clearly shown in Fig. 4 and are each provided with a pair of spaced bearings 27' in which are swivelled the shafts 28 rigidly connected to the forks 29 which carry wheels 30, the forks 29 being backwardly inclined as shown in Fig. 4 so that the fore-truck is supported on caster or trailing wheels; the construction being such that the weight at the forward end of the tractor is supported upon the forks 29 which are provided with bearing surfaces which take against and support the lower end of the bearings 27.

Firmly mounted upon the engine bed 10 and 11 above described is an internal combustion engine E provided with a driving shaft 40 which at its forward end carries a bevel pinion 41 (see Fig. 1). Mounted in the bearings comprising the half bearings 16 hereinafter described and corresponding half bearings bolted thereupon is a transverse shaft 42 (see Fig. 2) carrying on one end a fly wheel 43. This shaft drives the propelling wheels through differential mechanism described below and carries the controls i. e. speed changing and reversing mechanism which will now be described in turn.

Upon the half casing 6 is mounted the top half casing 6' provided with half bearings to complete the half bearings 16 and make the housings for the reversing and speed changing mechanism. In the right hand housing and mounted upon shaft 42 is a pair of sleeves 45 (see Fig. 2) each carrying adjacent one end a beveled gear 46 and projected therethrough to form hubs 47. Mounted upon the shaft 42 and at either end abutting against the end bearings of the right hand housing and provided with a depending fork 48 engaged with lug 48' are cam members comprising a disk 49, from which projects the integrally formed sleeve 50, and from which also projects the cam blocks 51 (three in number) arranged parallel to the sleeve 50, and having inclined surfaces 51' and flat tops 51''.

Journalled upon the sleeves 50 by means of the sleeves 52 are the co-operative cam devices comprising discs 53, cut away to seat firmly upon the ends 47 of the sleeves 45 having the projecting cam blocks 54, having inclines 54' and flat tops 54'', similarly located and formed to the cam blocks 51 and interfitted therewith. The entire circumferential periphery of these cam devices is provided with gear teeth, as shown.

Revolubly mounted in the top of the casing 6' is a shaft 56, having rigidly mounted thereon gear segments 57, in mesh with the gears 55. The shaft 56 is provided outside housing 6' with a crank arm 58 operable through the link 59 by means of the handle 60 which may be set by means of the notched circle 61 in any one of three positions corresponding to forward, neutral and reverse. The arrangement of the various elements just described is such that simultaneous rotation of the gears 55 will cause the sleeve 45, and consequently the gears 46, to shift longitudinally along the shaft 42, the abutting cam surfaces at one side taking up just as much distance as is lost by the abutting cam surfaces at the other side so that there is no lost motion in the connection. By this means either, or neither gear 46 may be meshed with the bevel pinion 41 on shaft 40, giving a forward, reverse or neutral drive to the machine. By providing these co-operative pairs of blocks, the action is rendered smooth, swift and certain and the provision of flat tops for the cam blocks locks the driving gear in either forward or reverse position without a strain on the reverse operating connections.

I will now describe the change speed gearing. The left hand side of the upper casing 6' is provided with a slot 70 (see Figs. 2 and 5) in which is slidably mounted the rack 71 having depending therefrom the fork 72 engaged in the groove 73 in the sleeve or hub 74 splined upon the shaft 42 and carrying unequal gears 75 and 76. Revolubly mounted in a housing 77 mounted on the top of the left hand housing 6' is a shaft 78 having keyed thereupon the gear segment 79 in mesh with the rack 71. The shaft 78 extends to the rear of the machine and is there provided with a crank handle 80 within reach of the operator and provided with mechanism of any well known form for setting it in one of a plurality of positions. Mounted in the two bearings formed by completing the two right hand half bearings 14 by attaching the half bearings 14' is a shaft 85 carrying at one end a fixed gear 86 and at its other end the loose gear 90 to be described. A brake wheel comprising a radial flange 87 and a rim 88' is pinned to the shaft 85 and firmly bolted to the radial flange 87 is a beveled gear 88.

The shaft 85 is at the left side of the machine, loosely sleeved in the extended hub 93' of bevel gear 93 which hub is journalled in the bearing formed by completing the half bearing 14 and carries at its outer end the gear wheel 90. To the gear 93 is rigidly bolted a brake wheel comprising a radial flange 91 and a rim 92. The beveled gears 88 and 93 are of the same size and are on the same center and face each other. Revolubly mounted upon and between the opposed beveled gears 88 and 93 by means of a plurality, in this instance 4, of beveled pinions 95 projecting radially inward therefrom and journalled upon the stub shafts 96, are integrally formed unequal gears 97 and 98 having a central aperture as shown, slightly larger than the gears 88 and 93 so that the gears 97 and 98 are journalled by means of the beveled pinions 95 upon the faces of the bevel gears 88 and 93. The gears 97 and 98 are selectively engaged by gears 75 and 76 above described so that the driving elements of the differential, namely, the beveled pinions 95, may be driven at either of two speeds.

The action of a differential drive is so well known that it need not be explained here. Suffice it to say that by the differential drive above described, the tractor may be made to turn corners or the like without either driving wheel being forced to slip or strain the machinery.

The brake wheels 88' and 92 are surrounded by brake bands 110 and 111 controlled by tightening arms 112 and 113 in turn operated by links 114 and 115. The links 114 and 115 are connected at their rear ends to handles 116 and 117 whereby the operator may brake either of the differentials. This operation is extremely useful in a machine of this character; by means of it the turning radius may be very materially reduced because the operator may bring one wheel to rest while the other is driving and thus pivot the machine and swing it about upon its own center. It should be noticed that the caster wheels being provided in the fore-truck the tractor of my invention may be steered either by means of the brakes just described, by which the machine can be turned upon a short radius or steered in any direction, the caster wheels merely trailing, or by means of the steering wheel control of the caster wheels shown, or by both methods at once. The selective and double control of the steering is of the greatest advantage, particularly in haulage and agricultural work where turns must be made in fence corners or other cramped spaces.

The gears 86 and 90 mesh with gears 100 in all respects alike (see Fig. 7) which are bolted to the ring 101 supported by spokes 102 integral with the hub 103 of the driving wheels 104. The ring 101 is reinforced by extension spokes 105 which are connected by means of brackets 106 with the T irons 107, rigid with the inside of the rims of wheels 104 and to which the main spokes of the tractor wheels are bolted, these spokes 108 being bolted at the inner ends to the rim 109 integral with the hub 103.

Having now described my invention, I claim:

1. In apparatus of the class described, a support having propelling wheels thereon, a prime mover having a drive shaft, a transverse shaft, a sleeve splined on said transverse shaft and having bevel gears at its ends, bearings for said transverse shaft, gears having cam surfaces thereon, cams having co-operating cam surfaces revolubly mounted on said shaft and bearing against the ends of said bearings to longitudinally shift said sleeve, and manually operable means for rotating said cams.

2. A reversing gear comprising a drive shaft having a bevel pinion thereon, a transverse shaft, a sleeve splined to said transverse shaft and having bevel gears thereon, bearings for said transverse shaft and on each side of said sleeve, cam members on each side of said sleeve and abutting said bearings, and rotary members having cam surfaces thereon to co-operate with the cam surfaces of the cam members abutting the bearings and interposed between said bearings and said sleeve, and means to rotate said rotary members in unison whereby said sleeve will be positively shifted.

3. A reversing gear comprising a drive shaft having a beveled pinion thereon, a transverse shaft, a sleeve splined to said transverse shaft and having bevel gears thereon, bearings for said transverse shaft and on each side of said sleeve, means having stationary cam surfaces, rotary members having cam surfaces thereon to co-operate with the stationary cam surfaces and interposed between said stationary cam surfaces and said sleeve, and means to rotate said members in unison whereby said sleeve will be positively shifted, and means operable at a distance from said gears to operate said means for rotating said members.

4. A reversing gear comprising a drive shaft having a driving gear thereon, a driven shaft having gears slidable along the driven shaft but rotatable therewith, cams on said driven shaft and co-operable with said driven gears for meshing either of said driven gears with said driving gear, and means for operating said cams in unison for positively shifting the driven gears.

5. A reversing gear comprising a drive shaft having a driving gear thereon, a driven shaft having gears slidable along the driven shaft but rotatable therewith, cams on said driven shaft and co-operable with said driven gears for meshing either of said driven gears with said drive gear, means for operating said cams in unison for positively shifting the driven gears, said means having cooperating abutting surfaces of different widths, whereby when the cams are moved in unison, relative rotary movement of the co-operating cams is effected for releasing the abutting engagement of said surfaces.

6. A reversing gear comprising a drive shaft having a driving gear thereon, a driven shaft having gears slidable along the driven shaft but rotatable therewith, cams on said driven shaft and co-operable with said driven gears for meshing either of said driven gears with said drive gear, means for operating said cams in unison for positively shifting the driven gears, said cams having inter-engageable cam projections and recesses, the ends of said projections having surfaces abutting the bottoms of said recesses when holding a driven gear in mesh with the drive gear, said bottoms of said recesses being wider than the end surfaces of the projections, whereby relative movement of the surfaces is effected for releasing the abutting engagement thereof.

7. In transmission gearing, the combination of a transverse shaft, opposed bevel gears thereon, an interposed bevel gear normally out of mesh with the two opposed bevel gears, means for driving the interposed bevel gear, and means for shifting the opposed bevel gears to bring either of the opposed bevel gear into mesh with the interposed bevel gear, said means including a member fixedly mounted, a sleeve engaging said member and cooperating with the opposed beveled gears to shift them into alternate mesh with the interposed bevel gear.

8. In transmission gearing, the combination of a transverse shaft, opposed bevel gears on said shaft, a bevel gear interposed between and normally out of mesh with the bevel gears on the shaft, a member concentric with the shaft, a sleeve engaging said member, means for rotating the sleeve for shifting said opposed bevel gears longitudinally of the axis thereof during the movement of the sleeve, thereby to move either of the opposed bevel gears into mesh with the interposed bevel gear.

9. In a device of the class described, a transverse shaft rotatably mounted, a pair of spaced opposite beveled gears on said shaft, a second shaft, a beveled gear thereon adapted to mesh with either of said first described beveled gears in different positions of the sliding movement of the beveled gears, a frame, spaced clutch members connected to the frame, clutch members mounted on said transverse shaft adjacent the first described respective clutch members, said second described clutch members being slidably supported on said transverse shaft, shoulders arranged to abut against said second described clutch members, the respective members of each pair of clutch members having co-acting notches and teeth, the co-acting teeth being provided respectively with beveled edges and with edges having their longitudinal axis parallel with the longitudinal axis of the transverse shaft.

10. In a device of the class described, a transverse shaft rotatably mounted, a pair of spaced opposite beveled gears on said shaft, a second shaft, a beveled gear thereon adapted to mesh with either of said first described beveled gears in different positions of the sliding movement of said beveled gears, a supporting frame, spaced clutch members connected to said frame, clutch members mounted on said transverse shaft adjacent to the first described respective clutch members, said second described clutch members being slidably supported on said transverse shaft, the respective members of each pair of clutch members having co-acting notches and teeth, the co-acting teeth provided respectively with beveled edges and with edges having their longitudinal axes parallel with the longitudinal axis of said transverse shaft, said teeth having flat outer ends.

11. In a device of the class described, a support, a shaft rotatably mounted, clutch members mounted on said shaft, co-acting clutch members on said shaft and arranged adjacent to the respective first described clutch members, the respective members of each pair of clutch members having co-acting notches and teeth, the co-acting teeth being provided respectively with beveled edges and with edges having their longitudinal axes parallel with the longitudinal axis of said transverse shaft.

12. A gearing for an agricultural machine comprising driving means including a driving gear, a cross shaft, a pair of driven gears on said shaft and deposed on opposite sides of the driving gear and movable to either mesh with the driving gear or into neutral position whereby the driven gears are out of mesh with the driving gear, a support for the shaft, means cooperable with the support and the driven gears for moving them to and out of mesh with the driving gear, said means comprising relatively helically movable elements to produce the movement of said driven gears, the relative movement of said elements being obliquely of the axis of said shaft, and means having notches and a projection for engagement successively in the notches to hold the driven gears in different moved positions with respect to the driving gear in the succesive positions of the alternate engagment with the driving gear and out of engagement with said driving gear.

In witness whereof, I hereunto subscribe my name to this specification in the presence of a witness.

HOWARD F. SNYDER.

Witness:
G. H. H. SAUNDERS.